United States Patent
Klein et al.

(10) Patent No.: US 8,229,489 B1
(45) Date of Patent: Jul. 24, 2012

(54) METHOD, MOBILE STATION AND BASE STATION FOR ESTABLISHING CONNECTIONS IN A RADIOCOMMUNICATIONS SYSTEM

(75) Inventors: Anja Klein, Berlin (DE); Michael Färber, Wolfratshausen (DE); Christian Lüders, Meschede (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,386

(22) PCT Filed: Oct. 26, 1998

(86) PCT No.: PCT/DE98/03134
§ 371 (c)(1),
(2), (4) Date: Apr. 27, 2000

(87) PCT Pub. No.: WO99/22462
PCT Pub. Date: May 6, 1999

(30) Foreign Application Priority Data

Oct. 27, 1997 (DE) .................... 197 47 451

(51) Int. Cl.
*H04B 7/00* (2006.01)
(52) U.S. Cl. .................... 455/522; 370/321
(58) Field of Classification Search .......... 455/69, 455/522, 561, 13.4, 502, 67.11; 370/229, 370/331, 468, 230, 228, 335, 336, 321, 324
See application file for complete search history.

(56) References Cited

U.S. PATENT DOCUMENTS

| 5,465,399 A | * | 11/1995 | Oberholtzer et al. | 455/69 |
| 5,564,075 A | | 10/1996 | Gourgue | |
| 5,729,557 A | * | 3/1998 | Gardner et al. | 714/774 |
| 5,806,003 A | * | 9/1998 | Jolma et al. | 455/522 |
| 5,838,674 A | * | 11/1998 | Forssen et al. | 370/337 |
| 5,878,329 A | * | 3/1999 | Mallinckrodt | 455/522 |
| 5,893,036 A | * | 4/1999 | Trandai et al. | 455/522 |
| 5,930,248 A | * | 7/1999 | Langlet et al. | 370/347 |
| 5,946,630 A | * | 8/1999 | Willars et al. | 455/466 |
| 5,995,064 A | * | 11/1999 | Yanagisawa et al. | 343/895 |

(Continued)

FOREIGN PATENT DOCUMENTS

WO   WO 93/07702   4/1993

OTHER PUBLICATIONS

Patent Abstracts of Japan—European Patent Office—Publication No. 05075571—Mar. 26, 1993.

(Continued)

*Primary Examiner* — Tu X Nguyen
(74) *Attorney, Agent, or Firm* — Staas & Halsey LLP

(57) ABSTRACT

A radio communication system, for example a TDMA/CDMA radio communication system, has at least one base station recurringly offering frequency channels for a random access for mobile stations in an upstream direction. The mobile station that requests a connection setup measures a reception power of a signal sent in a downstream direction by the base station and sets a transmission power for sending an access radio block to the base station dependent on the measured reception power. A variable transmission power control can thus be implemented at the mobile station side with the assistance of the measured reception power of the signal transmitted on the part of the base station, being also capable of being implemented for random access of the mobile stations, this having previously always occurred with maximum transmission power.

14 Claims, 3 Drawing Sheets

U.S. PATENT DOCUMENTS

| | | | | |
|---|---|---|---|---|
| 6,069,884 A | * | 5/2000 | Hayashi et al. | 370/335 |
| 6,078,823 A | * | 6/2000 | Chavez et al. | 455/562.1 |
| 6,101,179 A | * | 8/2000 | Soliman | 370/342 |
| 6,157,627 A | * | 12/2000 | Olofsson et al. | 370/329 |
| 6,282,491 B1 | * | 8/2001 | Bochmann et al. | 701/209 |
| 6,449,482 B1 | * | 9/2002 | Johansson et al. | 455/443 |
| 6,549,772 B1 | * | 4/2003 | Chavez et al. | 455/422.1 |

OTHER PUBLICATIONS

Paging in UMTS—Hegemann, RACE Mobile Telecommunications Workshop, vol. 1, Amsterdam, WL, May 17-19, 1994 (1994) p. 405-410.

Evolution Towards UMTS—Oudelaar, AT&T—NSI, Network Product Strategies, IEEE/ICCC.

* cited by examiner

METHOD, MOBILE STATION AND BASE STATION FOR ESTABLISHING CONNECTIONS IN A RADIOCOMMUNICATIONS SYSTEM

BACKGROUND OF THE INVENTION

The invention is directed to a method for connection setup before a mobile station of a radio communication system as well as to a mobile station configured in this way and to a base station.

The establishment of digital radio communication systems is disclosed in J. Oudelaar, "Evolution Towards UMITS", PIMRC 94, 5th IEEE International Symp. on Personal, Indoor and Mobile Radio Communications, the Hague, NL, 18 through 22 Sep. 1994, pages 852 through 856, and M. Lenti, H. Hageman, "Paging in UMTS", RACE Mobile Telecommunications Workshop, Vol. 1, Amsterdam, NL, 17 through 19 May 1994, pages 405 through 410.

The presently existing mobile radio telephone system GSM (Global System for Mobile Communications) is a radio communication system with a TDMA component for subscriber separation (time-division multiple access). Payload information of the subscriber connections are transmitted in time slots according to a frame structure. The transmission occurs block-by-block. Frequency channels adapted to the time grid of the frame structure (RACH random access channel) are also known from the GSM mobile radio telephone system for arbitrary access for the mobile stations. A mobile station that requests a connection setup can send an access radio block in this frequency channel without a frequency channel having been previously allocated to the mobile station. A transmission power control cannot occur given random access, since the transmission conditions are not yet known at the transmitter side. A mobile station therefore usually sends with maximum transmission power for the radio cell. Maximum transmission power is also selected in order to assure that a mobile station located at the edges of the radio cell that transmits an access radio block generates a signal at the base station that is strong enough for a detection. When a plurality of mobile stations simultaneously actuate the random access in the same time slot and frequency band, radio blocks lower in power would not be capable of being interpreted and would have to be re-transmitted at a later point in time by the affected mobile stations. When two or more signals having nearly the same power intensity arrive, both signals may possibly not be detected and must be re-initiated.

SUMMARY OF THE INVENTION

The invention is based on the object of offering a method and devices that enable the connection setup for the random access of the mobile stations in a radio communication system given optimally effective utilization of the radio-oriented resources. This object is achieved according to the method of the present invention for connection setup for mobile stations of a radio communication system having at least one base station, frequency channels for a random access are recurrently offered in an upstream direction for the mobile stations. With the mobile station that requests a connection setup, a reception power of a signal sent from the base station in a downstream direction is measured. With the mobile station, a transmission power dependent on the measured reception power for sending an access radio block to the base station is set. A mobile station and a base station are provided for implementation of the above method.

The radio communication system having at least one base station provides that frequency channels for a random access be offered in recurring fashion for the mobile stations in upstream direction. A reception power of a signal transmitted in downstream direction from the base station is measured by the mobile station that requests a connection setup, and a transmission power for sending an access radio block to the base station is set dependent on the measured reception power.

A flexible transmission power control can thus occur at the side of the mobile station with the assistance of the measured reception power of the signal transmitted at the base station side, this also occurring for the random access of the mobile station, this having hitherto not been available. As a result of the setting of the transmission power for the random access, a plurality of such accesses can simultaneously occur from different mobile stations without the other signals that are active in the same frequency band or on neighboring carriers being thereby disturbed or possibly being no longer detected. Neighboring channel interferences are reduced or, respectively, eliminated by the flexible power control for the access radio block or blocks, which need not be transmitted with maximum transmission power in every case. Due to the increased rate of successful detections of the access radio blocks that are transmitted—equivalent with a lower rate of reoccurring access attempts due to inadequate detection—, the radio-oriented resources are utilized better. Overall, the connection setup is also accelerated since fewer access attempts of the mobile station are needed until a successful connection setup has been achieved.

The invention can be particularly advantageously employed in a TD/CDMA radio communication system, since the access radio block is active in the same frequency band simultaneously with other payload signals—for example, traffic data or signalling information or organization information. The information of various connections can thereby be distinguished from one another and a frequency channel formed by the time slots on the basis of a connection-individual fine structure. This fine structure preferably comprises codes with which the individual subscriber signals are spread.

Over and above this, the invention leads to advantages where the principle of random access is modified such that the multiple access—preferably according to TD/CDMA—also occurs on neighboring carriers, so that high neighboring channel interferences are to be expected at the base station side given highly different reception powers of the different access radio blocks. It is precisely this that can be avoided by the invention, since great differences in the reception power are—from the point of view of the base station—compensated by the flexible transmission power control in the mobile station.

The above advantage derives when, according to a development of the invention, a broadband frequency range is divided into sub-ranges with narrower bandwidth within the frequency channel for the random access, the mobile station that requests the connection setup selecting one sub-range within the frequency channel and sending the access radio block to the base station in this sub-range.

In the transmission of the access radio block, this can be spread with an individual code at the transmitter side, so that a plurality of random accesses can also occur as warranted in one sub-range. Advantageously, the individual code represents the random number of the access block and can be selected from a set of allowed codes that are known to the receiving station. Alternatively thereto, it can be provided that the access radio block is not spread. The evaluation thereof is facilitated.

According to another development of the invention, the transmission power is set all the higher by the mobile station the lower the measured reception power is. The mobile station can thus optimally adapt the power to the conditions of the transmission link.

It has proven advantageous to estimate a radio field attenuation in the downstream direction with the mobile station on the basis of the measured reception power, and to set the transmission power such that the radio field attenuation is at least partially compensated.

The signal transmitted in the downstream direction with reference whereto the reception power can be measured can be a training sequence signal, a data signal, a pilot signal or a control signal transmitted on the BCCH channel according to advantageous developments.

It is also advantageous when at least one auxiliary information is inserted into the signal transmitted in downstream direction, this being employed by the mobile station for setting the transmission power. The auxiliary information is preferably composed of an information about the transmission power used by the base station in downstream direction. The mobile station thus receives an information that it can directly employ for setting the transmission power suitable for the individual case and that it can additionally interpret for measuring the reception power.

The invention is explained in greater detail below on the basis of an exemplary embodiment with reference to graphic illustrations.

DESCRIPTION OF THE PREFERRED EMBODIMENTS

Figure 1:
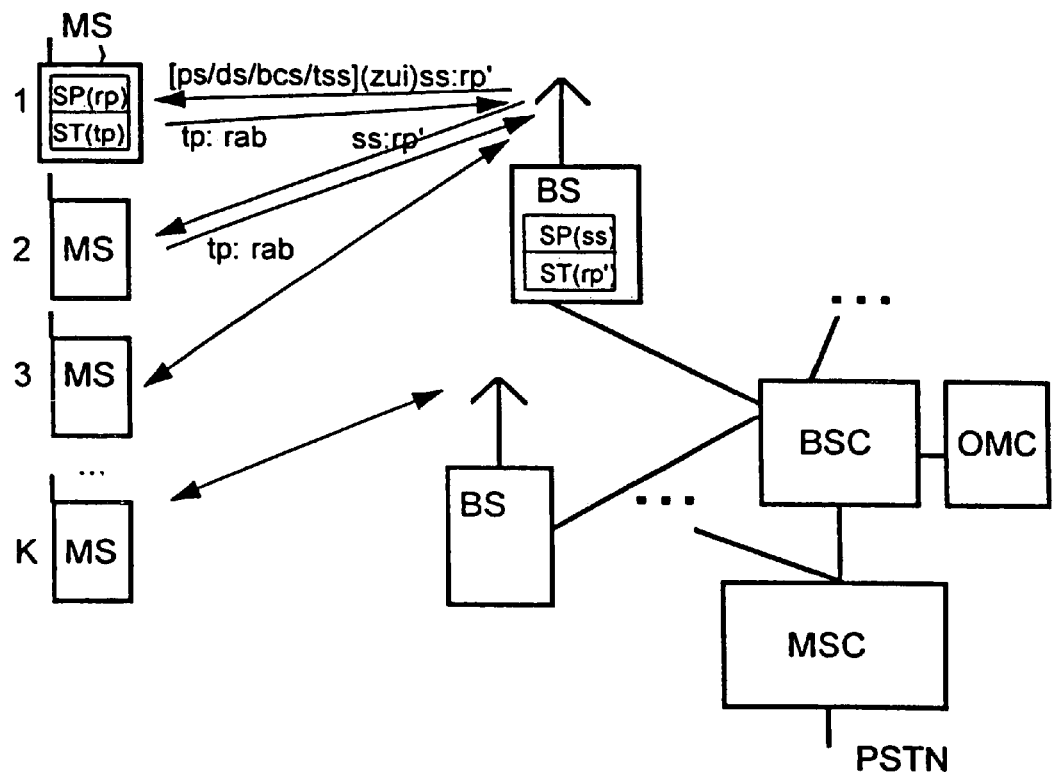
FIG. 1 is a block circuit diagram of a mobile communication system for connection setup for random accesses of a mobile station.

In terms of structure, the mobile communication shown in FIG. 1 corresponds to a known GSM mobile radio telephone system that comprises a plurality of mobile switching centers MSC that are networked with one another or, respectively, that produce the access to a fixed network PSTN. Further, these mobile switching centers MSC are respectively connected to at least one base station controller BSC. Each base station controller BSC in turn enables a connection to at least one base station BS. Such a base station BS is a radio station that can setup message connections to mobile stations MS via a radio interface. An operation and maintenance center OMC realizes operation and maintenance functions for the mobile radio telephone network or, respectively, for parts thereof. Three connections for transmitting payload information and signalling information between three mobile stations MS1, MS2, MS3 and a base station BS are shown by way of example in FIG. 1. The functionality of this structure can be transferred onto other radio communication systems wherein the invention can also be utilized.

The mobile stations MS can initiate a random access in the upstream direction on their own without a frequency channel having been previously allocated to the mobile station. For supporting the random access, the system respectively offers frequency channels (rach, random access channel) adapted to the time grid of a frame structure used for radio transmission. A mobile station that requests a connection setup can send an access radio block rab in this frequency channel. According to the invention, the mobile station MS that requests a connection setup measures the reception power rp of a signal ss sent in the downstream direction from the base station BS, and sets a transmission power tp for sending the access radio blocks rab dependent on the measured reception power rp. The signal ss is made available to the base station BS by a signal processing unit SP, is provided with a transmission power rp' by a control unit ST of the base station BS, and is transmitted to the mobile station via the radio interface. The signal ss with reference whereto the reception power rp can be measured by a signal processing unit SP of the mobile station MS can— according to advantageous solutions—, be a training sequence signal tss given employment of a TD/CDMA radio transmission (see FIG. 2), a data signal ds, a pilot signal ps or a control signal bsc transmitted on the BCCS channel (broadcast channel). The transmission power tp for the access radio block rab is preferably set all the higher by a control unit ST of the mobile station MS the lower the reception power rp measured by the signal processing means SP is.

Additionally, there is the version for the mobile station MS to have an auxiliary information zui inserted into the signal ss by the base station BS and transmitted via the radio interface interpreted by the signal processing means SP in order to have optimally many parameters available for transmission power control for the random access. The auxiliary information zui, which is preferably composed of an information about the transmission power rp' set in the downstream direction is used at the mobile station side for setting the transmission power for sending the access radio block rab.

In collaboration with the control unit ST, the signal processing unit SP implements an estimation of the radio field attenuation of the connection between base station BS and mobile station MS on the basis of the measured reception power rp, implementing this over and above the former. The transmission power tp is subsequently set such that the identified radio field attenuation can be at least partially compensated. A complete compensation control of the radio field attenuation is likewise possible. The overall attenuation of the transmission channel employed is composed of a separation attenuation, of the shadowing and of the rapid fade. A limited leveling of the radio field attenuation estimated from measuring the power has the advantage with respect to the two first-cited cases that other signals that are simultaneously active in the same frequency band—such as, for example, payload information (see FIG. 2) or further access radio blocks (see FIG. 3)—are only slightly disturbed by the transmitted access radio block rab. When, despite the power setting taking the momentary transmission conditions into consideration, the random access has not been detected at the initial attempt—for example, due to a currently strong attenuation given rapid fade—, a renewed random access can be initiated by the mobile station MS with slightly increased transmission power tp.

The above comments apply correspondingly to other mobile stations MS that wish to start the random access simultaneously or offset in time. The method of the invention yields advantages precisely when a plurality of mobile stations actuate the random access in the same time slot and frequency band in which other signals are active. A transmission of the access radio block rab with maximum transmission power would result in extreme interference and a non-detection of these other signals. This disadvantage can be avoided by the flexible control of the transmission power tp for sending the access radio block rab in each mobile station dependent on the measured reception power of the received signal ss on the individual connection.

Figure 2:
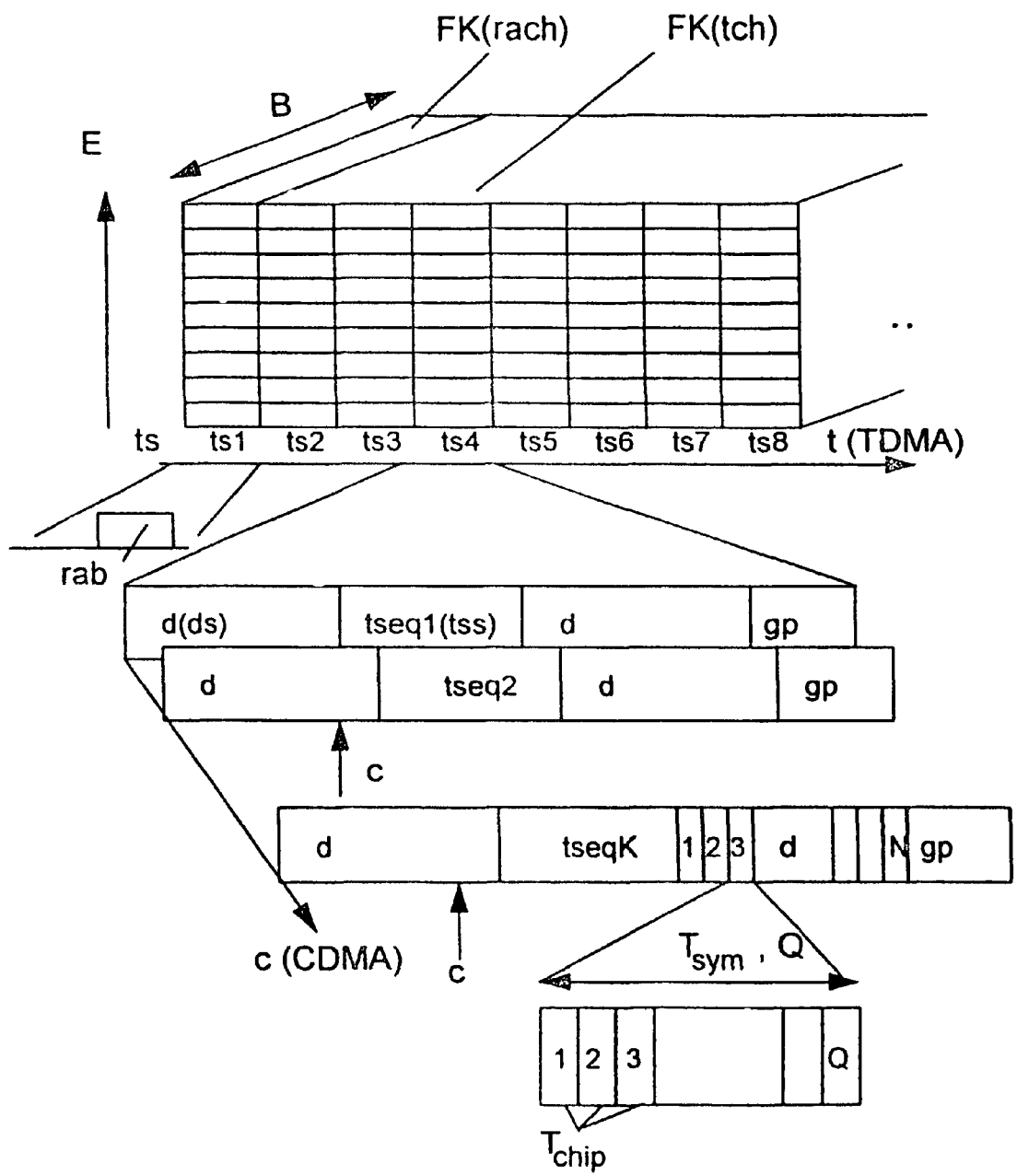
FIG. 2 is a schematic illustration of the frame structure for the radio transmission.

The frame structure of the radio transmission is described in FIG. 2 with reference to the example of a combined TD/CDMA method but can also be applied without further ado to the other radio transmission method—for example, continuous methods such as DS-CDMA (direct sequence CDMA). The invention is also not limited thereto that a plurality of connections simultaneously exist between mobile stations and one or more base stations. The signals also need not be capable of being distinguished from one another by a connection-individual fine structure; rather, for example, they can be separated by time slots. According to a TDMA component of the TD/CDMA method, a division of a broadband frequency range B—for example, B=1.6 MHz—into a plurality of time slots ts, for example eight time slots ts1 through ts8, is provided. Each time slot ts within the frequency range B forms a frequency channel FK. Information of a plurality of connections are transmitted in radio blocks within frequency channels FK (tch) that are provided for payload data transmission. These radio blocks for payload data transmission are composed of sections having data d in which sections having training sequences tseq1 through tseqK known at the reception side are embedded. The data d are connection-individually spread with a fine structure, a subscriber code c, so that, for example K connections can be separated by these CDMA components at the reception side.

The spread of individual symbols of the data d effects that Q chips having the duration $T_{chip}$ are transmitted within the symbol duration $T_{sym}$. The Q chips thereby form the connection-individual subscriber code c. A guard time gp for compensation of different signal running times of the connections is also provided within the time slots ts.

The successive time slots ts are divided according to a frame structure within a broadband frequency range B. Thus, eight time slots ts are combined into a frame, whereby, for example, one time slot ts4 of the frame forms a frequency channel FK (tch) for payload data transmission and is recurringly used by a group of connections. One frequency channel FK (rach) for the random access of the mobile stations MS is not offered in each frame but is offered at a predetermined point in time within a multi-frame. The spacings between the frequency channels FK (rach) for the random access determine the capacity that the mobile communication system makes available for this part of the connection setup. According to the exemplary embodiment, the transmission of the access radio block rab is provided in the time slot ts1. The signal sent in downstream direction for measuring the reception power and that is employed by the mobile station for setting the transmission power can be taken in a simple way as data signal ds from the data d or as training sequence signals tss of the training sequence of a radio block transmitted in downstream direction, so that no additional seizure of radio-oriented resources is required for this purpose.

Figure 3:
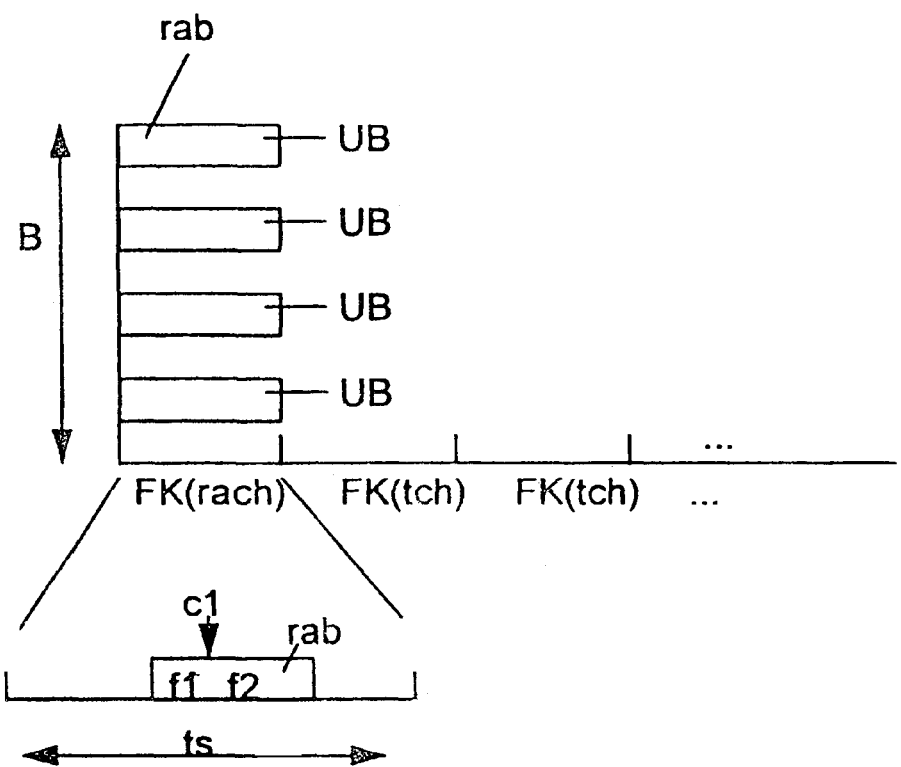
FIG. 3 is a schematic illustration of the division or frequency channel for random access into sub-ranges.

FIG. 3 shows the structure of the frequency channel FK (rach) for random access. The broadband frequency range B=1.6 MHz that, for example, is calculated from the frequency band of an organization channel of the mobile communication system charged with the duplex spacing, contains four sub-ranges UB each having a respective bandwidth of, for example, 200 kHz that are respectively separated by a range of 200 kHz in order to reduce mutual disturbances. Access radio blocks rab can be sent within the sub-ranges UB as needed by mobile stations MS without prior allocation at the network side and without spreading. Access radio blocks according to the GSM standard can thus be employed. Given an alternative division of the frequency channel FK(rach) for random access, a total of eight sub-ranges UB are realized; these can overlap in terms of frequency. For better discrimination, the access radio block rab are spread with an individual code c1 but can also be fundamentally transmitted without spread.

The access radio block rab is shorter compared to the radio blocks for payload data transmission according to FIG. 2, the guard time is lengthened. This is necessary in order to assure a reliable reception in the base station BS despite the time synchronization having not yet occurred. The access radio block rab is beamed out with the transmission power that can be variably set according to the invention. The access radio blocks rab contains a bit sequence f1 known at the reception side for time synchronization and contains a random number f2. On the basis of the known bit sequence f1, the base station BS can determine the presence of an access radio block rab and can undertake a first time synchronization from the point in time of the arrival. The random number f2 selected by the mobile station MS, which can simultaneously represent a reference to the individual code c for spreading the access radio block rab, is used as reference for the following allocation of a frequency channel FK for further signalling for the connection setup. The mobile station MS can recognize the allocation addressed to it with this random number f2.

Figure 4:
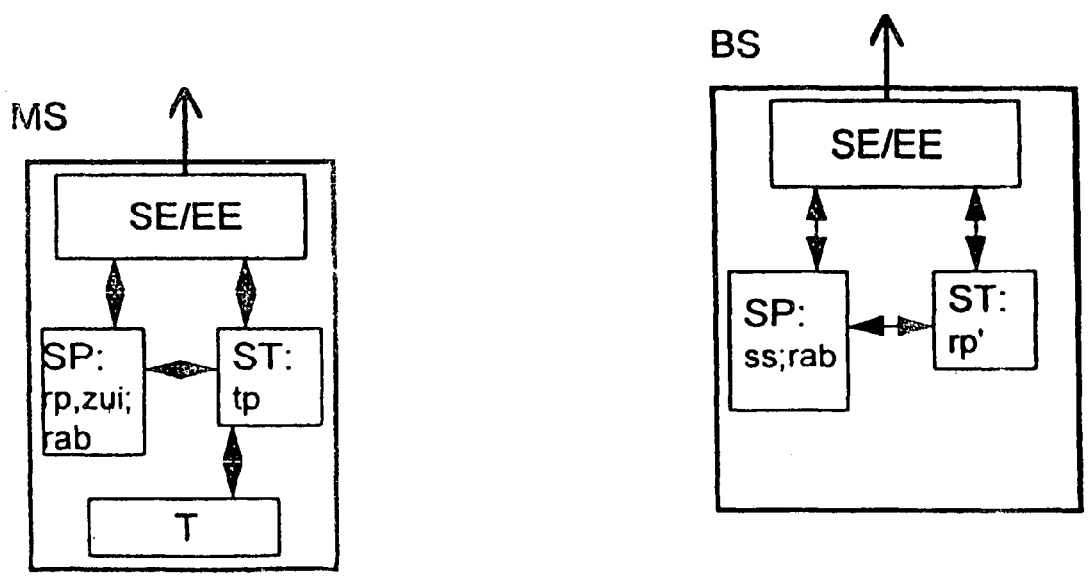
FIG. 4 shows block circuit diagrams of the mobile station and the base station.

FIG. 4 shows the structure of a mobile station MS as well as of a base station BS with the devices required for the invention. The base station BS can detect and evaluate the access radio blocks transmitted in the frequency channels for the random access and can undertake a subscriber separation and a detection of the subscriber data for the payload information transmitted in the frequency channels.

The mobile station MS contains a control panel T, a signal processing unit SP, a control means ST and a transmission/reception unit SE/EE. The subscriber can undertake inputs at the control panel T, including an input for a connection setup request. An access radio block rab is formed in the signal processing unit SP and is transmitted via the transmission/reception unit SE/EE with the transmission power rp set in the control unit ST. The control unit ST selects the sub-ranges within the nearest possible frequency channel for random access according to the above-described principles. The access radio block rab—following a corresponding signal editing—is sent narrow-band in the selected sub-range by the transmission unit SE. Previously, the signal processing unit SP interprets the signal ss that has arrived via the transmission/reception unit SE/EE, in that it measures the reception power rp thereof and communicates this to the control unit ST. For example, the measurement of the reception power occurs by summing up the squares of the samples of the received signals ss—in the digital—or by integration over the squares of the signal amplitudes—in the analog—or by summing up the estimated samples of the channel pulse response. This is carried out in the signal processing unit SP. The determination of an estimated value for the reception power can also be interpreted as measurement. The auxiliary information zui potentially contained in the signal ss is likewise interpreted by the signal processing unit SP and made available to the control unit ST for controlling the transmission power.

The base station BS contains a transmission/reception means SE/EE that amplifies reception signals, converts them into the base band and demodulates them or, respectively, that modulates transmission signals like the signal ss and edits them for the high-frequency emission. A signal processing unit SP that, for example, comprises a GD processor as digital signal processor for detecting arriving payload information and signalling information according to the JD-CDMA method (joint detection) also interprets the access block or blocks rab. The signal ss that is to be beamed out in downstream direction is provided with the transmission power rp' by a control unit ST and is incorporated into a radio block according to FIG. 2 as data signal or training sequence signal. When this is a matter of a pilot signal, it is sent independently of a payload data transmission—preferably continuously. Given employment of the BCCH control signal, the signal ss is incorporated as control signal by the control unit ST and, for example, is sent to the mobile station MS as organization information.

The separation of the various sub-ranges ensues with a filter bank and an individual interpretation of the access block rab in the respective sub-ranges subsequently ensues. Alternatively, a prior low-pass filtering can be foregone and a detection can be implemented broad-band with a single user interpretation or with a joint detection interpretation.

The interpretation ensues by determining the correlation between the received signals and the bit sequences known in the base station BS (see FIG. 3). The point-in-time of the greatest correlation is thereby also identified, this serving subsequently for time synchronization. Alternatively, a signal-adapted filtering or some other linear algorithm (for example, according to the zero forcing or the minimum square error criterion) can also be applied.

Although various minor changes and modifications might be proposed by those skilled in the art, it will be understood that my wish is to include within the claims of the patent warranted hereon all such changes and modifications as reasonably come within my contribution to the art.

We claim as our invention:

1. A method for connection setup for mobile stations of a radio communication system having at least one base station, comprising:
    recurrently offering frequency channels for a random access in an upstream direction for the mobile stations;
    in the mobile station that requests a connection setup, measuring a reception power of a signal sent from the base station in a downstream direction;
    sending, from the base station to the mobile station, information about base station transmission power in the downstream direction; and
    in the mobile station, setting a mobile station transmission power, dependent on the measured reception power and the information about the base station transmission power, for sending an access radio block to the base station,
    wherein if the access radio block, sent to the base station, has not been successfully detected by the base station, a new access radio block is sent by the mobile station with increased power, and
    wherein the signal transmitted in the downstream direction is a pilot signal.

2. The method according to claim 1, wherein the radio communication system is configured as a TDMA/CDMA radio communication system, a plurality of connections between the mobile frequency channels information of different connections can be distinguished from one another according to a connection-individual code, whereby information is simultaneously transmitted between stations and the base station in time slots based on the information of the codes used to separate information of different connections.

3. The method according to claim 2, wherein the information of different connections are spread with the individual codes.

4. The method according to claim 1, wherein the mobile station sets the mobile station transmission power all the higher the lower the measured reception power is.

5. The method according to claim 1, wherein another signal transmitted in the downstream direction is a training sequence signal.

6. The method according to claim 1 wherein another signal transmitted in the downstream direction is a data signal.

7. The method according to claim 1, wherein the mobile station estimates a radio field attenuation in the downstream direction on the basis of the measured reception power and sets the mobile station transmission power such that the radio field attenuation is partially compensated.

8. The method according to claim 7, wherein the mobile station sets the mobile station transmission power such that the radio field attenuation is completely compensated.

9. The method according to claim 1, wherein a broadband frequency range is divided into sub-ranges having a narrower bandwidth within a frequency channel for the random access, the mobile station that requests the connection setup selecting a sub-range within said frequency channel, and the mobile station sending the access radio block to the base station in this sub-range.

10. The method according to claim 1, wherein the access radio block is not spread.

11. The method according to claim 1, wherein the access radio block is spread with an individual code.

12. A mobile station to which a connection setup is to be provided in a radio communication system having at least one base station, and wherein frequency channels are recurrently offered for a random access in an upstream direction for the mobile station, comprising:
    a measuring unit for measuring a reception power of a signal sent from the base station in a downstream direction when the mobile station requests a connection setup;
    a transmission power setting unit which, dependent on measured reception power, sends an access radio block to the base station;
    a receiving unit receiving information about base station transmission power used by the base station in the downstream direction; and
    a control panel for triggering the random access,
    wherein said measuring unit comprises a signal processing unit for measuring the reception power of the signal sent in the downstream direction from the base station and for generating the access radio block,
    wherein said transmission power setting unit comprises a control unit for setting the transmission power for the transmission of the access radio block to the base station dependent on the measured reception power and the information about the base station transmission power,
    wherein if the access radio block, sent to the base station, has not been successfully detected by the base station, a new access radio block is sent by the mobile station with increased power, and
    wherein the signal transmitted in the downstream direction is a pilot signal.

13. A base station in a radio communication system wherein a connection setup occurs from mobile stations, and wherein the mobile station that requests a connection setup measures a reception power of a signal sent from the base station in a downstream direction, and wherein the mobile station sets a transmission power dependent on the measured reception power for sending an access radio block to the base station, comprising:
- a unit for recurrently offering frequency channels for a random access in an upstream direction for the mobile stations;
- a signal processing unit for generating the signal to be transmitted in the downstream direction; and
- a control unit for setting a transmission power for sending the signal to the mobile station that requests the connection setup,
- wherein if the access radio block, sent to the base station, has not been successfully detected by the base station, a new access radio block is sent by the mobile station with increased power,
- wherein the signal transmitted in the downstream direction is a pilot signal, and
- wherein information about base station transmission power used by the base station in the downstream direction is sent from the base station to the mobile station and is employed by the mobile station for setting the transmission power.

14. A mobile station for transmission of data, block-by-block, to a base station on frequency channels, which are recurrently offered for random access, comprising:
- a measuring unit for measuring a reception power of a broadcast signal transmitted by the base station, the broadcast signal being selected from the group consisting of a training sequence signal, a data sequence signal, a pilot signal and a control signal;
- a transmitter to send an access radio block to the base station without a frequency channel having been previously allocated to the mobile station, the access block requesting a connection setup with the base station, the transmitter transmitting the access block to the base station on a random access channel;
- a receiving unit to receive information about base station transmission power used by the base station in the downstream direction; and
- a power limiter to limit a transmission power of the access radio block before transmission of the access radio block, based on the information about the base station transmission power and the reception power of the broadcast signal transmitted by the base station, such that the transmission power is reduced for a larger reception power and the transmission power is increased for a lower reception power,
- wherein if the access radio block, sent to the base station, has not been successfully detected by the base station, a new access radio block is sent by the mobile station with increased power.

\* \* \* \* \*